United States Patent [19]

Borghi

[11] 3,783,957

[45] Jan. 8, 1974

[54] APPARATUS FOR SUPPLYING LOOSE MATERIALS IN AMOUNTS OF WEIGHT TO CONTINUOUSLY MOVING CONTAINERS

[75] Inventor: Vincenzo Borghi, Modena, Italy

[73] Assignee: Azionaria Costruzioni Macchine Automatiche A. C. M. A. S.p.A., Bologna, Italy

[22] Filed: Oct. 26, 1971

[21] Appl. No.: 192,552

[30] Foreign Application Priority Data
Nov. 7, 1970 Italy .................. 3610A/70

[52] U.S. Cl............. 177/54, 177/52, 177/53, 177/55, 177/103, 177/105, 177/114
[51] Int. Cl.............................................. G01g 13/00
[58] Field of Search...... 177/52–59, 83–88, 90, 98, 177, 102, 103, 105, 108–110, 114, 115, 118

[56] References Cited
UNITED STATES PATENTS

| | | | |
|---|---|---|---|
| 493,795 | 3/1893 | Smyser | 177/84 |
| 1,425,251 | 8/1922 | Gwinn | 177/56 |
| 667,560 | 2/1901 | Nickerson | 177/55 |
| 977,378 | 11/1910 | Dunkerly | 177/98 |
| 2,387,585 | 10/1945 | Howard | 177/55 |
| 2,660,394 | 11/1953 | Skeuse et al. | 177/56 |
| 2,669,412 | 2/1954 | Nowak | 177/90 |
| 3,098,537 | 7/1963 | Petrea | 177/98 |
| 3,138,217 | 6/1964 | Bahr et al. | 177/58 |
| 3,225,847 | 12/1965 | Vergobbi et al. | 177/52 |

Primary Examiner—Richard B. Wilkinson
Assistant Examiner—Vit W. Miska
Attorney—Guido Modiano et al.

[57] ABSTRACT

An apparatus for the supply of loose materials in amounts of determined weight to containers, comprising a horizontal continuously moving endless conveyor provided thereon with regularly spaced seats for containers a first station for placing the containers to be filled on the said conveyor and a second station for releasing the filled containers therefrom, between the said first and second stations and over the said conveyor it further comprises at least one series of automatic stationary scales capable of receiving product from at least one feeding station and arranged to intermittently release amounts of product of determined weight, at least two series of hoppers regularly spaced from one another and relative to the scales and seats, and arranged at a level lower than that of the series of scales, each series of hoppers including a number of hoppers equal to that of the scales and being carried movable along a path parallel to the series of scales and another length parallel to a section of the said conveyor, the said series of hoppers being also controlled alternatively to one another thus successively going from a standstill condition below the scales to receive the amounts of product to a motion condition in time relationship with the conveyor to discharge the amounts of product into the containers on the conveyor, relative series of conveyors being provided at the outlets of the scales and hoppers.

3 Claims, 4 Drawing Figures

PATENTED JAN 8 1974

INVENTOR
VINCENZO BORGHI

BY

AGENT

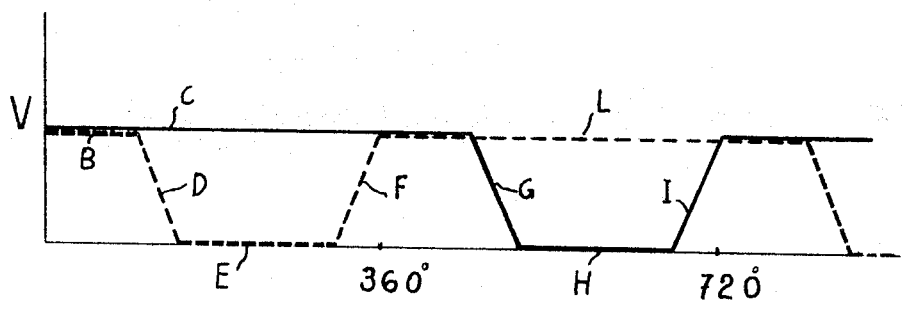
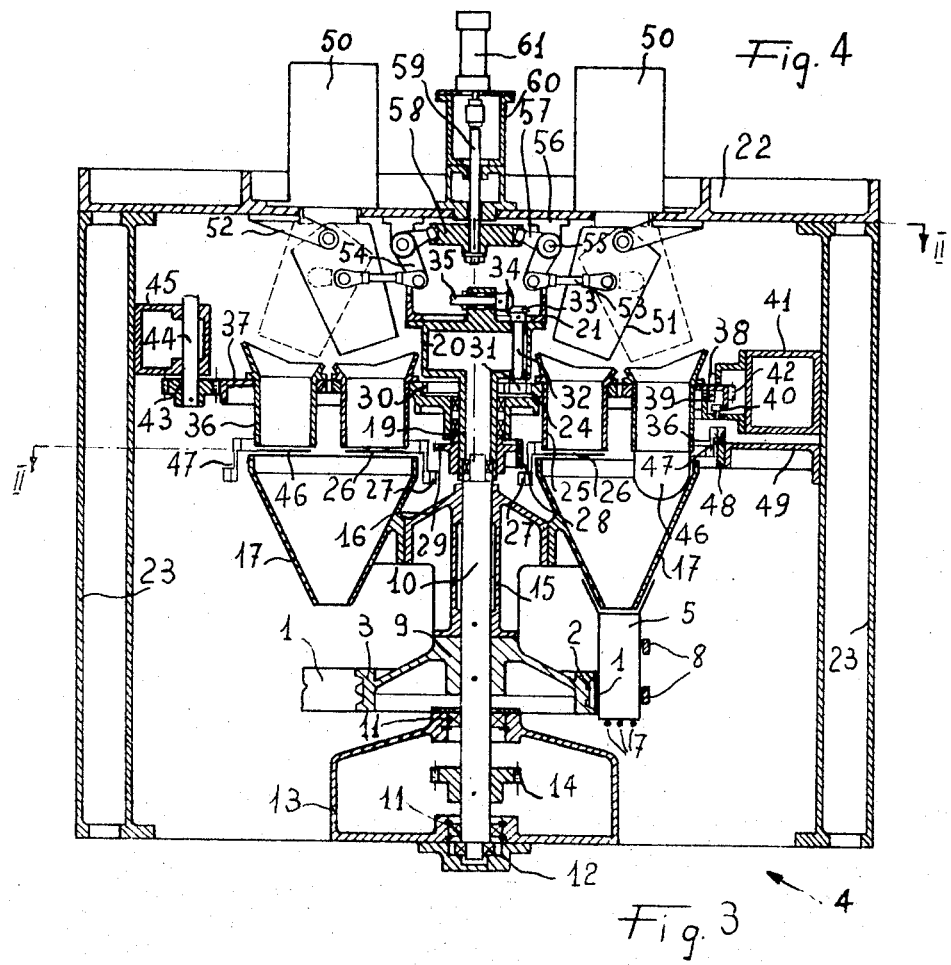

APPARATUS FOR SUPPLYING LOOSE MATERIALS IN AMOUNTS OF WEIGHT TO CONTINUOUSLY MOVING CONTAINERS

BACKGROUND OF THE INVENTION

The present invention relates to an apparatus for dispensing loose products in amounts of determined weight to containers which are arranged at fixed length from one another in relative seats formed in an endless and continuously horizontally moved conveyor. Such apparatus is used in automatic packaging machines for continuously packaging loose grain or powder materials.

Automatic packaging machines of the type stated above are already provided with apparatuses having a plurality of elements dispensing amounts of material and arranged to move continuously along an endless path partly extending according to the path of the containers. Along the said path the dispensing elements move substantially at the same speed as the containers, so that amounts of product can be transferred from the said dispensing elements to the containers.

The known dispensing elements are sometimes of volumetric type, i.e. they have chambers or spaces of determined capacity. When a product of constant density has to be packaged, such chambers supply a quantity of determined volume and thus of determined weight.

However some products which are automatically packaged in mass production, are of varying density and also undergo notable changes relative to an average density value. In such a case no correspondence exists between volume and weight of product. To obviate this inconvenience it has been suggested to vary the capacity of the chambers of the dispensing elements as a function of product density variations.

The provision of variable density chambers since the chambers are moving, involves notable difficulties as to the construction. Such difficulties are particularly of importance in the control means arranged to vary the capacity of the chambers, in the sensors of the density of the products, which actuate such control means, as well as in those elements which deliver product to the same sensors.

Owing to such difficulties, it is quite difficult to assure a perfect adjustment of the various components of the apparatus and inevitable clearances and lags occur, thereby the known apparatuses had to be produced with automatic scales located past the variable capacity chambers and arranged to control the weight of the amounts. The scales however, are moving together with the apparatus and also in this respect difficult problems are met. Furthermore the measuring time of the scales must be taken into account. The scales therefore are often elements limiting the output of the automatic machines for packaging loose products or materials with variable density.

SUMMARY OF THE INVENTION

An object of the present invention is that of substantially eliminating the above mentioned difficulties and limitations of the known apparatuses used at present in a simple, reliable and cheap manner.

These and further objects are attained according to the present invention by an apparatus for the supply of loose products in amounts of determined weight to containers which are arranged at a constant distance from one another in relative seats of an endless and horizontally continuously moving conveyor, said amounts being dispensed by a plurality of scales fixedly mounted on the framework of the apparatus and supplied by a feeding station, wherein according to the improvement it comprises support members for two series of hoppers arranged below the said scales and each including a number of hoppers equal to that of the product amounts fed by the said scales, means for driving said support members to move each series of hoppers alternately from a rest condition below the scales to a motion condition together with the containers arranged on the conveyor and viceversa, chute-like means cooperating with the said scales and having outlets orientable alternately on to the hoppers of either series to discharge the product amount into the hoppers of the series being in the rest condition, funnel means arranged below the hoppers and continuously moved so as to have their outlets aligned on the openings of the containers carried by the conveyor, a means for controlling the outlets of the hoppers to discharge into said funnel means and then into the containers the amounts of product from the hopper series moving together with the containers.

BRIEF DESCRIPTION OF THE DRAWINGS

The invention will better appear from the following detailed description of a preferred not exclusive embodiment of the apparatus according to the invention, reference being made to the accompanying drawings, in which:

FIG. 3 is a vertical section view along lines III—III in FIGS. 1 and 2; and

FIG. 4 is a diagram showing the succession of the standstill and motion steps of the series of hoppers of the apparatus.

DESCRIPTION OF THE PREFERRED EMBODIMENTS

Figure 1:
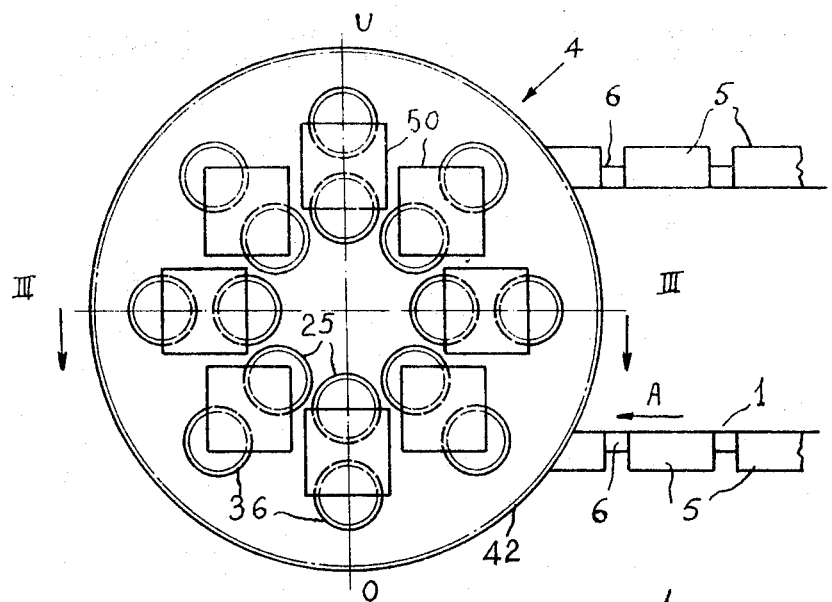
FIG. 1 is a diagrammatic top view of the apparatus according to the invention.

With reference to the above figures, in particular to FIGS. 1 and 3, the automatic machine for packaging loose products comprises a flexible endless tape 1 arranged on a base support in a horizontal plane and continuously moving in a direction indicated by the arrow A. The tape 1 is provided with inner transverse ribs 2 evenly arranged in a spaced relationship therealong and meshing with the periphery of horizontal toothed pulleys around which the tape 1 is wound. In FIG. 1 only the pulley relative to the apparatus according to this invention is shown. Such pulley is indicated at 3 while at 4 the whole apparatus is indicated. Upstream and downstream of the apparatus 4 there is provided a suitable station (not shown) for placing the containers 5 to be filled on the tape. Downstream of the apparatus 4 another station (also not shown) releases the already filled and closed containers. The containers 5 on which the machine operates are boxes obtained from a sheet material. The tape 1 is provided with outer transverse projecting portions 6 evenly spaced therealong in order to successively receive the containers 5 arranged one after the other. The latter while being moved by the tape 1 are supported and guided by rods 7 and a side wall 8 extending along the path of the tape 1.

Figure 2:
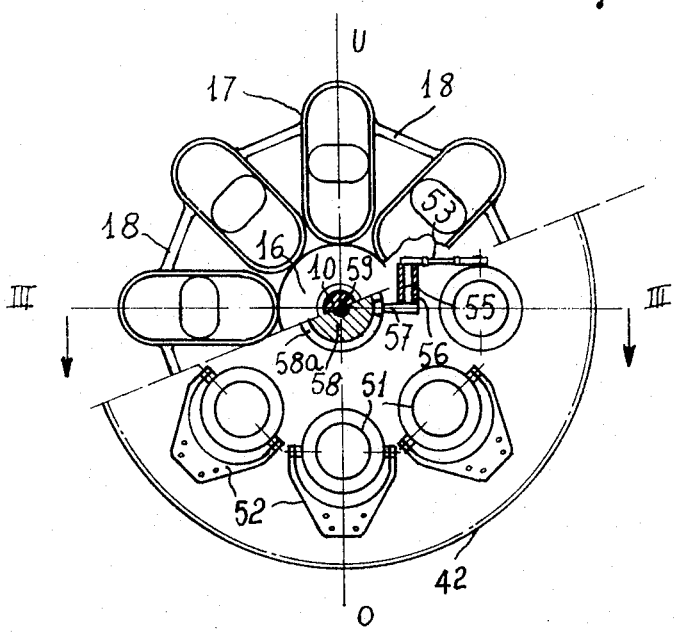
FIG. 2 is a diagrammatic section view taken along lines II—II in FIG. 3.

The hub 9 of the pulley 3 is secured through pins to a vertical shaft 10 which is mounted for rotation by means of roll bearings 11 and trust bearings 12 inside the housing 13 secured to the base of the machine. Within the said housing a toothed wheel 14 is keyed on the shaft and driven by the power means of the machine. The pulley 3 rigid with the shaft 10 is thus the driving pulley for the tape 1. Above the pulley 3 a sleeve 15 is secured to the shaft 10 and carries an outwardly extending member 16. A series of vertical funnels 17 are secured to the periphery of the member 16 (see also FIG. 2) and regularly spaced from one another with an angle equal to that of the containers on the tape 1 and in time relationship therewith. The funnels 17 are connected to one another also by the arms 18. And as will better appear below, from a number of conveyors which dispense amounts of product to the containers 5 located on the periphery pulley 3. The outlet opening of the funnels is in fact arranged above the opening of the containers. The top end of the shaft 10 is centered by means of roll bearings within the lower end of a hollow projection 19 of a stationary box 20 secured below the drum 21.

The drum is in turn secured under the cross member 22 of the apparatus frame, which is supported by the base of the machine through the uprights 23. Beneath the box 20 around the projection the sleeve of a disc 24 is mounted for rotation by means of roll bearings. A first series of hoppers 25 is arranged on the periphery of the disc 24. The hoppers cross the disc 24 and have a suitably shaped upper inlet while the outlet thereof is normally closed by a respective door 26. The door 26 is articulated to the relative hopper and is held in closed position by spring elements not shown in the figure and which act between the door element and hopper. The hinge axis of each door is radial to the shaft 10, and has a crank 27 fixed to it, provided with a idle roller. For the opening of the door element, as will be better described in the following the roller of the crank 27 engage the upper contour of a stationary cam 28 which is carried by the bush 29 fixed on the lower portion of the projection 19. The stationary cam 28 extends concentrically to the shaft 10, in practice from the angular position 0 in FIG. 1, in which the tape 1 comes into contact with the pulley 3, up to a suitable distance from the angular position U, in which the tape leaves the pulley. The initial portion of the cam 28, in a known way and therefore not shown, consists of a section articulated to a stationary support according to an axis radial to the apparatus axis, and oscillating in a plane substantially tangential to the cam 28. Such section is actuated by a suitable control (such as an electro-magnet) so that the free end thereof alternatively assumes a low position and a high position and can act as a deviator for the crank 27. In fact when the free end of such a section is low, the roller of the crank 27 of a door 26, during rotation of the disc 24, abuts thereagainst and is deviated on the contour of the cam 28, and the door 27 is thus caused to open. If instead the free end of such a segment is at a high position, the roller of the crank 27 remains at its level and passes under the cam 28 and the door remains closed. The disc 24, as will be better specified in the following, is actuated so as to rotate together with the funnels 17. To this purpose the disc 24 is provided with an upper and central cavity with an internal toothed rim 30, on which the sprocket 31 gears. The sprocket 31 is keyed to an end of a vertical shaft 32, which is rotatably supported in to the box 20, and on whose other end a conical pinion 33 is fixed. This latter pinion engages another conical pinion 34, which is keyed to an end of a horizontal shaft 35. The shaft 35 is rotatably mounted on a protuberance of the box 20 and is actuated intermittenly by a suitable power means comprising a first wheel of the type having radial pins and a wheel of the co-called Z type, that is a wheel provided with grooves having a profile which depends on the law of motion to be obtained, with which the pins of the first wheels engage in succession so as to give the said wheel of Z type an intermittent motion. When the disc 24 rotates synchronically with the funnels 17 the outlet openings of the hoppers 25 which have an equal angular distribution to that of the funnels 17, are superimposed on the inner zone of the openings of the same funnels. Alternately with the hoppers 25 the hoppers 36 rotate synchronically with the funnels 17 and correspondingly have their outlets super-imposed to the external zone of the openings of the funnels 17. The second series of hoppers 36 is applied to a ring 37, which is rotatable mounted concentrically around to the disc 24. The ring 37 is supported and guided by groups of three rollers 38, 39 and 40, which hold the same ring from the upper, lower and lateral side thereof. The small rollers of each group are rotatably carried by respective supports 41, which are fixed to the uprights 23. The ring 37, for its rotation, has peripheral teeth 42, with which the sprocket 43 gears, keyed to the vertical shaft 44. This latter shaft is rotably carried by the support 45, fixed to one of the uprights 23, and is actuated in an analogous way to the shaft 35 by a suitable driving means. The hoppers 36, which cross the ring 37, also have inlet openings appropriately shaped and have lower closure doors 46, with cranks 47 and rollers. The doors 46 open when the roller of their crank 47 engage with the stationary cam 48, supported by arms 49 carried by the columns 23. The cam 48 is analogous and has the same circular extension of the cam 28 and an articulated section at the entrance, which may be controlled as the corresponding section of cam 28.

On the cross member 22 of the frame of the apparatus 4, a series of automatic scales 50, is located, of known stationary type. The scales 50 are used to receive product from a feeding station not shown. They are adjusted so as to form with this product respective amounts of prefixed weight. They are besides arranged to unload said amounts of product intermittently all together. The stationary scales 50 are located along a circumference concentric to the axis of the shaft 10, with the same angle from one another of the funnels 17. The outlet openings of the scale 50 are superimposed to the openings of respective tubular chutes 51, which are oscillatingly supported by respective fork supports 52, fixed under the cross member 22. To each of the chutes 51 an end of a relative control rod 53 is then articulated. Every control rod 53 has the other end articulated to an arm 54 of a lever with two arms, which at 55 is mounted oscillatingly to a respective support 56 lowerly fixed to the cross member 22. The other arm 57 of the two armed lever has at its end a roller, which is always in engagement with the groover 58a (FIG. 2) of the disc 58, which is inside the drum 21. The disc 58 is secured to the lower end of the vertical stem 59 which is aligned to the axis of the shaft 10 and is vertically slidably guided in a kind of turret 60, fixed on to the cross member 22. The upper end of the stem 59 is connected to the shank of a fluid dynamic jack 61, fixed on the same turret 60. The stem 59 can therefore alternatively assume the position shown in FIG. 4 or a lower position. Correspondingly all the chutes 51 assume the angular position shown in the figure for the emptying of the hoppers 24, or the angular position indicated with dotted lines in the same figure, for the emptying in the hoppers 36.

With reference now to the figure which illustrates the operation of the apparatus, it should be noted that in the same figure in abscissa are shown the degrees of which the pulley 3 is rotated to start from an initial instant (that is the time in which the same pulley and funnels 17 reach the relative angular position), while in ordinate the angular velocities of the disc 24 and the ring 37, are shown, where V indicates the angular velocity so that the disc and ring rotate synchronically with the pulley and the funnels 17. With continuous lines the angular velocity degree diagram is then indicated, of the ring 37, while with dotted lines the relative diagram of the disc 24 is shown. As from the diagram, initially the ring 37 and the disc have the same angular velocity V of the pulley 3 and of the funnels 17. Along the segment B of the diagram, the disc 24 continues a little to still have the angular velocity of the assembly 3-17, while, along the segment C, the ring 37 rotates at the same angular velocity for a little more than 360° of rotation. Assume initially that the ring 37 has all its hoppers 36 filled up with respective weighed amounts of product and the cam 48 has its initial section in the low position. When a first hopper 36 is in the angular position 0, the roller of the crank 47 of the door 46 relative to this hopper 36 engages said initial section and the door 46 begins to open. When the roller reaches the profile of the cam 48 the door 46 completes its opening and, through the corresponding funnel 17, the amount of product passes into the under placed container 3. After a suitable period of time, that is before the U angular position and before 180° of rotation, the first hopper 36 can close again since the roller descend from the profile of the cam 48. All the successive hoppers act in such a manner. In order to obtain a perfect empting of the last hoppers the ring 37 rotates through an angle of 360° together with the assembly 3-17 and the initial section of the cam 48 remains in a lower position for a while. In the meantime, after the segment B, the disc 24, decelerates (segment D) until standstill, along the segment E. The hoppers 25 are therefore halted under the chutes 51, which have assumed the relative angular position. The scales 50 can therefore unload into the hoppers 25, which have their doors 26 closed. After the unloading of the scales 50, the disc 24 accelerates (segment F) reaches the angular velocity V after 360° from the instant taken as the beginning. From this point the initial section of the cam 28 has assumed the low position and the hoppers 25 begin one behind the other to empty. In the meantime also the last hoppers 36 have finished the unloading and the initial section of their cam 48 is carried into the high position, for which all the doors due to the action of resilient means close and remain closed. Along the segment G, the ring 37 decelerates until bringing to a halt its hoppers 36 under the chutes 51 which have in the meantime taken the other angular position for the descent of the stem 59 (segment H in the diagram). The ring 37 accelerates then (segment I), and reaches again the velocity V after 720° of rotation of the assembly 3-17 from the initial instant, while at the end of the segment L, also the disc 27 terminates its rotation, at the velocity V.

In the case that upstream of the apparatus 4, a sensitive suitable sensor does not indicate the presence of a container 3, in the relative seat, a signal will be transmitted which blocks that automatic scale 50 which successively should deliver the amount of product in to the locking container 3, In this case the scale 50 will conserve the amount of product for the successive dispensing.

It should be noted that the initial sections of cams 28, 48 have the free ends thereof at an upper level during acceleration and deceleration steps (segments D, F; G I) of the disc 24 and ring 37. During such steps in fact the cranks 27, 47 must be prevented from being driven in order to prevent the doors 26, 46 from open before the hoppers 25, 36 rotate together with the funnels 47 or some of them remain in an open condition while amounts of product are supplied from the scales 50 to the hoppers 25, 36.

The invention is susceptible to numerous modifications and changes. The hoppers 25, 36 and the funnels 17 instead of being mounted for rotation or circumferentially arranged around an axis, could be secured to endless chains extending above and parallel to the conveyor 1. Of course the scales 50 and the chutes 51 will be arranged over the hoppers according to the path followed by the said chains.

I claim:

1. An apparatus for the supply of loose products in amounts of determined weight to containers which are arranged at a constant distance from one another in relative seats of an endless and horizontally continuously moving conveyor, said amounts being dispensed by a plurality of scales fixedly mounted on the framework of the apparatus and supplied by a feeding station, wherein, according to the improvement, it comprises support members for two series of hoppers arranged below the said scales and each including a number of hoppers equal to that of the product amounts fed by the said scales, means for driving said support members and conveyor, said support members being arranged to move each series of hoppers below the scales successively from a rest condition to a motion condition, chute-like means co-operating with the said scales and having outlets orientable alternately on to the hoppers of either series to discharge the product amounts into the hoppers of the series being in the rest condition, funnel means arranged below the hoppers and continuously moved so as to have their outlets aligned on the openings of the containers carried by the conveyor, a means for controlling the outlets of the hoppers to discharge into said funnel means and then into containers the amounts of product from the hopper series moving together with the containers.

2. An apparatus as claimed in claim 1, wherein it comprises a plurality of scales arranged along a circumference, two annular elements concentric to one another and to said circumference and each carrying a series of hoppers equal in number to and being angularly arranged as the said scales, the said annular elements being mounted for rotation below the scales and alternately controlled to move along a circumferential length corresponding to an angle of at least 360°, tubular chutes linked below the relative scales and oscillating along radial planes to the rotation axis of the annular elements, control means for the said tubular chutes to orientate the outlets onto the inlet openings of the hoppers of the resting series, a plurality of funnels equal in number to a series of hoppers and arranged below the said annular elements, the inlet opening of said funnels extending radially to receive the amounts of product from either series of hoppers.

3. An apparatus as claimed in claim 2, wherein the outlets of the hoppers of each series are controlled by doors articulated on radially extending pins provided with crank elements controlled by a circumferentially extending stationary cam which has an initial section moving between two positions in one of which such portion engages with the crank while the hoppers rotate continuously thus causing the same to slide along the cam profile and causing the relative doors to open, while in the other portion during acceleration and deceleration of the hoppers it does not engage with the crank thus leaving the doors in a closed condition.

* * * * *